United States Patent [19]

Wiseman

[11] Patent Number: 4,905,514
[45] Date of Patent: Mar. 6, 1990

[54] METHOD AND APPARATUS FOR MEASURING FLUID FLOW

[76] Inventor: Donald F. Wiseman, 24 Lindabury Rd., Bernardsville, N.J. 07924

[21] Appl. No.: 230,676

[22] Filed: Aug. 5, 1988

Related U.S. Application Data

[63] Continuation of Ser. No. 843,200, Mar. 24, 1986, abandoned, which is a continuation-in-part of Ser. No. 630,373, Jul. 12, 1984, Pat. No. 4,599,895.

[51] Int. Cl.$^4$ .............................. G01F 1/68
[52] U.S. Cl. ................................. 73/204.18
[58] Field of Search ........... 73/204.11, 204.18, 204.19, 73/204.25, 204.27; 364/510

[56] References Cited

U.S. PATENT DOCUMENTS

| | | | |
|---|---|---|---|
| 3,220,255 | 11/1965 | Scranton et al. | 73/204 |
| 3,800,592 | 4/1974 | Jones et al. | 73/204 |
| 3,891,391 | 6/1975 | Boone | 73/204 |
| 4,043,196 | 8/1977 | Trageser | 73/204 |
| 4,070,908 | 1/1978 | Newell | 73/204 |
| 4,264,961 | 4/1981 | Nishimura et al. | 364/510 |

OTHER PUBLICATIONS

Datametrics Bulletin 600, Published 1952, p. 21 and FIGS. 1-3.
Ali, "Hot-Wire Anemometry in Moderately Heated Flow", in Rev. Sci. Instruments, vol. 46, #2, 2/75.

Primary Examiner—Herbert Goldstein
Attorney, Agent, or Firm—Richard J. Rodrick

[57] ABSTRACT

A method and apparatus for the measurement of fluid flow through a conduit comprises determining, from one or more measuring elements, a first value related to the velocity of fluid flowing through the conduit. A second value, related to the temperature of fluid ambient to the conduit, is also determined. The method further includes establishing a third value related to the physical configuration of the measuring means. The first, second and third values are then used to calculate a power dissipation factor of the measuring means to be used in calculating a velocity indication which substantially eliminates errors due to changes in ambient temperature and caused by velocity cooling within the conduit.

16 Claims, 6 Drawing Sheets

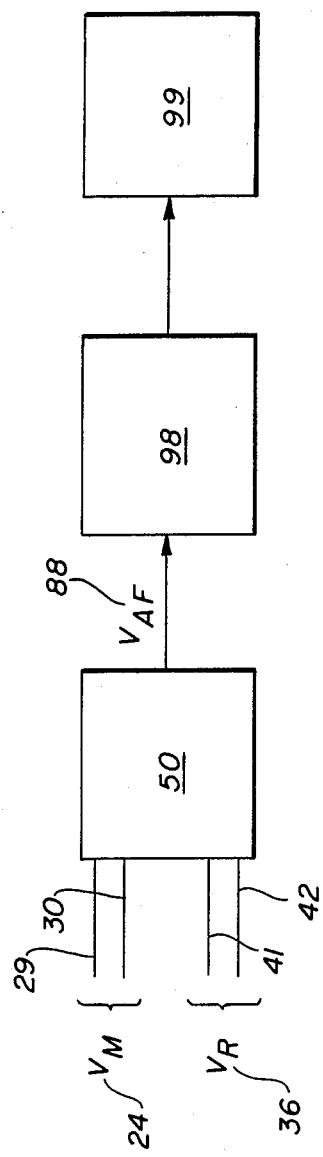

METHOD AND APPARATUS FOR MEASURING FLUID FLOW

This application is a continuation of application Ser. No. 843,200 filed Mar. 24, 1986, now abandoned which is a continuation-in-part of Ser. No. 630,373, filed Jul. 12, 1984, now U.S. Pat. No. 4,599,895.

BACKGROUND OF THE INVENTION

1. Field of the Invention.

The present invention relates to an apparatus and method for the measurement of fluid flow through a conduit, and more particularly, concerns an apparatus and method for the measurement of air flow through a conduit which accounts for measurement errors due to changes in ambient temperature and caused by velocity cooling of the measurement elements within the conduit.

2. Description of the Prior Art.

In many instances where fluids flow through a conduit, tubing or the like, it is desirable to know the velocity of the moving fluid. For purposes of the ensuing discussion, as well as the scope of the present invention, the term "fluid flow" includes liquid flow as well as gas flow, particularly airflow. In conduit units useful for heating or air conditioning purposes, the velocity of airflow through the ductwork is an important parameter in determining the efficiency and proper operability of the system. Accordingly, a reliable technique for measuring airflow through these heating, air conditioning or like airflow systems is desirable to obtain this important characteristic. Moreover, the measurement of the airflow through the conduit should be accurate, as well as reliable.

Early techniques for determining airflow through a conduit relied upon an instrument known as an anemometer. The anemometer relied upon a windmill effect with a series of cups extending from a rotatable axle. Air captured by the cups would cause the cups to spin thereby rotating the axle, the speed of which could be measured to correspond to velocity of the air moving through the system. For heating, air conditioning or the like ductwork systems, however, a mechanically operated instrument such as an anemometer would not always be feasible or practicable.

Early electronic anemometers deviated from the mechanical spinning technique and relied upon electrical resistance for measuring airflow. For example, an electrically conductive wire would be positioned within the conduit and exposed to the air flowing therethrough. Passing an electrical current through this wire would cause the wire to increase its temperature. Since the airflow through the conduit causes a cooling effect once air passes the wire, a drop in temperature of the wire would result. Concurrent with this drop in temperature of the wire would be a change in electrical resistance of the wire. This change in electrical resistance could be related to the velocity of air passing the wire. Such an early anemometer had a number of deficiencies, including only point measurement within the cross-sectional plane of the conduit, and no compensatory factors which took into account the temperature of ambient air or the like.

An improved electronic anemometer was described by Pollack in the Feb. 1957 edition of Popular Electronics. Instead of an electrically heated wire element, the improved electronic anemometer relied upon a modified Wheatstone bridge in which two thermistors formed a part of the bridge and were closely matched in nominal resistance so that the bridge could be balanced. Current flowing through the thermistors caused them to heat; one of the thermistors was exposed to moving air, which caused the thermistor to cool and its resistance to rise sharply. Accordingly, the Wheatstone bridge balance was changed, causing the meter to indicate a reading. The amount of the meter deflection was determined by the magnitude of the resistance change, which, in turn, was a function of airflow velocity.

While these electronic anemometers are able to measure airflow, accuracy, nevertheless, remained a problem. Some of these problems were addressed in U.S. Pat. No. 4,494,406, wherein one of the inventors of that patent is the inventor of the present invention. The problems addressed in the patented invention included the use of a plurality of measuring resistors, connected in electrical series, and positioned at various locations in a given plane across the fluid flow conduit. Such a resistor arrangement purportedly improves accuracy since many locations of the flowing air are sampled to obtain the velocity determination. Another area addressed by the patented invention is in the use of a reference resistor sensitive only to changes in ambient temperature. The resistance value of the reference resistor is subtracted from the resistance of the measuring resistors to produce a resistive value in terms of fluid flow.

While these improvements in the measurement of airflow through a conduit are noteworthy, problems still persist. Most significantly, the prior art has failed to recognize that the measurement of airflow is a function of the rate of cooling of the heated resistor element by the moving air. Further, the ambient temperature affects the cooling rate of the resistor element as well as changing its resistance due to its temperature versus resistance characteristics. The aforementioned Wheatstone bridge circuit compensates only for the latter phenomenon, i.e., airflow at constant temperature. In this regard, the effects of increased rates of heat transfer related to the combined effects of temperature and airflow (velocity) are not accounted for in the prior art devices. As a result, errors in measurement occur with changes in ambient temperature.

Other airflow measurement apparatuses are described in U.S. Pat. Nos. 4,214,478; 4,196,622; and 3,951,113. These patented airflow measuring apparatuses also fail to account or compensate for the combined effects of temperature and airflow cooling on the measuring elements.

It is, therefore, the purpose of the present invention to provide an apparatus and method for the measurement of airflow through a conduit which accounts for and compensates for the combined effects of temperature and airflow cooling of the measuring element.

SUMMARY OF THE INVENTION

The apparatus of the present invention measures fluid flow through a conduit. At least one thermally sensitive element is provided which is capable of producing a measurement value related to temperature located within the conduit. This element is exposed to the flow of fluid through the conduit. This apparatus includes means for producing a reference value related to temperature of fluid ambient to the conduit. The reference value is substantially unaffected by heat generated by the producing means itself. Means are provided to determine the measurement and reference values and to use these values to produce an indication which substantially eliminates errors due to changes in the ambient temperature and caused by velocity cooling of the thermally sensitive element. The indication is representative of fluid flow through the conduit.

In a preferred embodiment of this aspect of the invention, the apparatus measures airflow through a conduit and includes at least one thermally sensitive electrical resistor serving as a measuring resistor located within the conduit and exposed to the flow of air therethrough. A housing, associated with the conduit, encloses a thermally sensitive electrical resistor serving as a reference resistor. The volume and material construction of the housing are sufficient to permit natural convection to occur during operating temperatures of the reference resistor. Air temperature within the enclosed housing is able to be maintained at a level substantially equal to air temperature ambient to the housing. An electrical circuit means is provided for determining the resistance values of the measuring resistor and the reference resistor. This circuit means produces a temperature- and airflow-compensated voltage output based on the resistance values. The voltage output is representative of airflow through the conduit.

Another aspect of the present invention is a method for the measurement of fluid flow through a conduit. This method includes determining a first value related to the temperature of fluid flowing through the conduit and determining a second value related to the temperature of fluid ambient to the conduit. The first and second values are used to produce an indication which substantially eliminates errors due to changes in ambient temperature and caused by velocity cooling within the conduit. The measurement method further involves relating the indication to a value of fluid flow through the conduit.

The further aspect of the present invention is an apparatus and method which provides a different measurement of fluid flow through the conduit. In this method, a first value related to the velocity of fluid flowing through the conduit is determined from measuring means. A second value is determined related to the temperature of fluid ambient to the conduit. A third value is established related to the physical configuration of the measuring means. This method includes using the first, second and third values to produce a calculated velocity indication which substantially eliminates errors due to changes in ambient temperature and caused by velocity cooling within the conduit.

In accordance with the principles of the present invention, measurement of airflow through a conduit is reliably and accurately accomplished. Factors either ignored or not appreciated by the prior art, which have a negative influence particularly on the accuracy of measurement, have been identified and utilized in the present invention. Specifically, the measuring resistance element, preferably a thermistor, exhibits a change in electrical resistance with a change in temperature. It has been found that ambient temperature affects the cooling rate of the thermistor as well as the fact that its resistance changes due to its inherent temperature versus resistance characteristics.

By devising an electrical circuit which accounts for these temperature and airflow cooling effects, and to compensate for these effects, the accuracy and reliability of airflow measurement is markedly enhanced. In systems such as heating or air conditioning conduits, such enhanced accuracy and reliability of airflow measurement will improve the efficiency and operating performances of such systems. In addition to the novel electrical circuitry features of the present invention, ambient air conditions are accounted for by the unique approach in housing the reference resistor element. By including the reference resistor in an enclosure of sufficient volume whereby natural convection currents simulate an infinite volume of still air, and due to heat transfer by convection and conduction to the ambient surroundings, compensation is made for the effects of ambient temperature on the cooling rate of the thermistor. The features of the present invention are well-adaptable to a variety of airflow systems, such as mentioned above, and are also suitable for liquid flow systems.

BRIEF DESCRIPTION OF THE DRAWINGS

FIG. 8 is a schematic representation illustrating the interrelationship among the signals for $V_M$ and $V_R$, the circuitry for producing an electrical signal representing $V_{AF}$ and the microprocessor for processing the signals for calculating velocity of air flow and for presenting the results.

DETAILED DESCRIPTION

Figure 1:
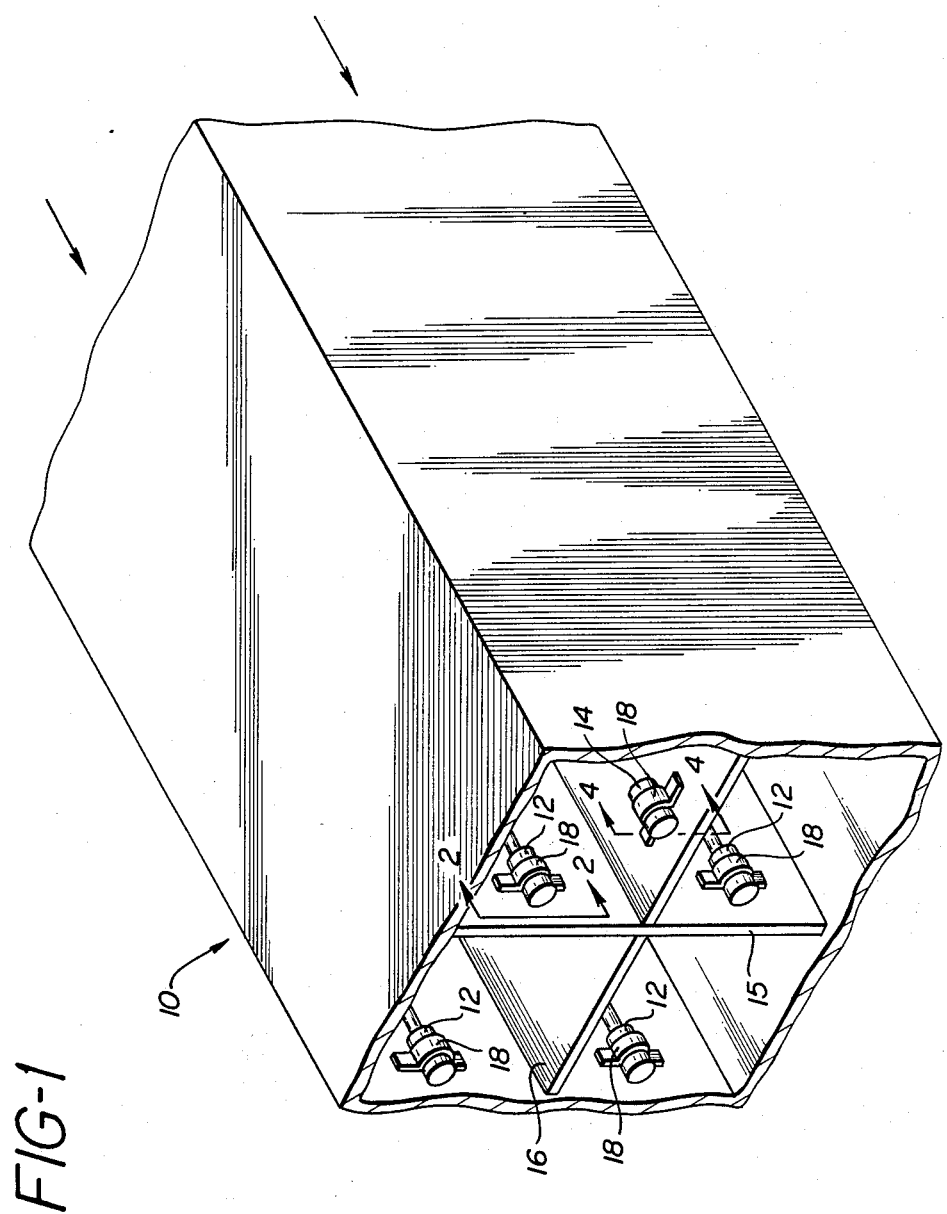
FIG. 1 is a perspective view of a typical section of ductwork for heating or air conditioning illustrating one arrangement of the measuring and reference resistors of the present invention.

While this invention is satisfied by embodiments in many different forms, there is shown in the drawings and will herein be described in detail a preferred embodiment of the invention, with the understanding that the present disclosure is to be considered as exemplary of the principles of the invention and is not intended to limit the invention to the embodiment illustrated. The scope of the invention will be measured by the appended claims and their equivalents.

Adverting to the drawings and FIG. 1 in particular, there is illustrated a fluid movement conduit 10. This conduit, for example, may be a section of ductwork commonly known and available for heating or air conditioning purposes. Air is caused to flow through conduit 10 in the direction of the arrows illustrated in FIG. 1. A pump, blower or the like (not shown) generally is provided in a central location to cause air to flow through the conduit.

In order to accurately measure the airflow through the conduit, the preferred embodiment of the present invention includes a plurality of flow cells 12, each of which includes a measuring resistor, and a reference cell 14. It can be seen in FIG. 1 that conduit 10 has been divided into four compartments by virtue of a vertical plate 15 and a horizontal plate 16. Two of flow cells 12 are mounted on the vertical plate, in different locations, while the other two flow cells are mounted in different locations along one of the walls of the conduit. Brackets 18 are provided to maintain the flow cells and the reference cell in position within the conduit. By dividing the cross-sectional plane of conduit 10 into four compartments, airflow can be measured at four different places so that the average airflow can be determined. It is understood that the inclusion of four flow cells for measuring purposes is merely suggestive of one embodiment of the present invention, and that there may be fewer or greater numbers of flow cells for airflow measurement. In fact, the principles of the present invention are satisfied by the inclusion of only one flow cell with a measuring resistor along with one reference cell with a reference resistor.

While it is preferred to include reference cell 14 inside conduit 10 as illustrated in FIG. 1, it is also feasible to mount reference cell 14 outside of the conduit. Of course, if the reference cell is outside of conduit 10, it will be sensing ambient air conditions which are different from the ambient air conditions inside the conduit when air is flowing therethrough. Therefore, since ambient air conditions affect the measurement of airflow, it is preferred to position the reference cell within the air flowing inside the conduit.

Figure 2:
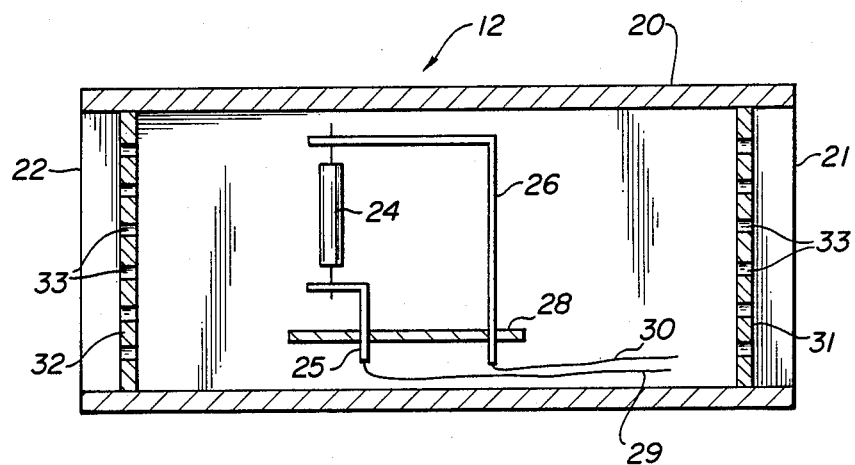
FIG. 2 is an enlarged cross-sectional view of the flow cell of the present invention which encompasses a measuring resistor, taken along line 2—2 of FIG. 1.
Figure 3:
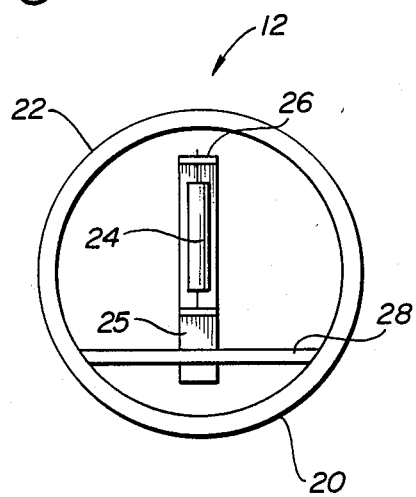
FIG. 3 is an end view of the flow cell of the present invention, illustrated without the screen to smooth turbulent airflow.

Turning now to FIGS. 2 and 3, the details of flow cell 12 are illustrated. Flow cell 12 preferably includes a cylindrically shaped flow tube 20 oriented within conduit 10 so that air may flow into a first open end 21 and out of a second open end 22. A thermally sensitive electrical resistor 24, such as a thermistor, is mounted within flow tube 20 by virtue of two electrically conductive supports 25 and 26, respectively. These electrically conductive supports are held in position by an insulating support 28. Electrical lead wires 29 and 30 are connected to electrically conducted supports 25 and 26, respectively. Two open-mesh, screen members 31 and 32 with a plurality of openings 33 therethrough are included across the cross-sectional plane of flow tube 20. Screen 31 is positioned upstream of resistor 24, whereas screen 32 is positioned downstream of the resistor. The open-mesh nature of the screens disrupt the airflow through flow tube 20 thereby reducing the turbulence of air passing over thermally sensitive element 24. It can be seen that resistor 24 is placed directly in the airflow moving through conduit 10 so that once heated, the cooling effects of air will be perceived on the resistor. Since resistor 24 is preferably a thermistor, a change in electrical resistance will result as the temperature of the thermistor changes. As will be explained hereinafter, this change of resistance can be related to the airflow or velocity of air through the conduit.

Figure 4:
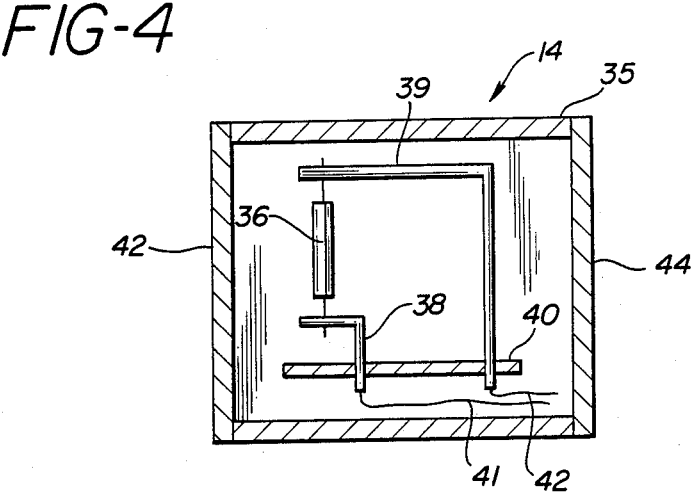
FIG. 4 is an enlarged cross-sectional view of the reference cell of the present invention which encompasses the reference resistor, taken along line 4—4 of FIG. 1.

Referring now to FIG. 4, reference cell 14 is illustrated. A preferably cylindrical tube 35 forms the outer periphery of reference cell 14. It is further preferred that the inside diameter of tube 35 be similar to the inside diameter of tube 20 of flow cell 12 so that the environments of the respective resistors within may be matched. Mounted within tube 35 is a thermally sensitive electrical resistor 36, which may be a thermistor such as previously described with respect to thermistor 24. Two electrically conductive supports 38 and 39 are provided to maintain resistor 36 in position. An electrically conductive material 40 is provided to mount electrically conductive supports 38 and 39. Two lead wires 41 and 42 are connected to conductive supports 38 and 39, respectively.

Flow cell 14, however, is adapted to prevent air from flowing through tube 35. In this regard, two end plates 42 and 44 cover the ends of tube 35 to provide a housing which encloses resistor 36. Of course, provision is made to bring lead wires 41 and 42 out of the enclosed housing by means of small holes which may be potted or sealed, if appropriate. It is preferred that tube 35 and end plates 42 and 44 be made of thermally conductive material, such as metal, to facilitate a thermal exchange between the inside and the outside of flow cell 14.

Specifically, resistor 36 is included in the present invention in order to serve as a reference resistor. As a reference resistor, its purpose is to detect ambient air conditions of the air flowing through the conduit and to provide a mechanism for subtracting the effects of ambient air during the measurement of air flowing through the conduit. However, since reference resistor 36 generates heat, the housing which encloses it will therefore be affected by such heat. In fact, if the housing surrounding the reference resistor is sufficiently small, the air inside the reference cell will act as an insulating blanket. The net result of such a structure will be an inaccurate measurement of ambient air. According to the present invention, it has been determined that reference resistor 36 should be enclosed in a volume sufficiently large to permit natural convection to occur during operating temperatures of reference resistor 36. For example, and without in any way suggesting a limitation, reference resistor 36 for purposes of the present invention may operate in still air between 8° and 50° C. When heated to its operating temperature, reference resistor 36 reaches an equilibrium with the ambient temperatures surrounding thermally conductive reference cell 14 due to convection currents within the enclosure and thermal conduction to the outside atmosphere. In order to assure adequate heat transfer by convection, it has been determined that the volume within the flow cell 14 should be at least fifty times the volume of reference resistor 36, and that such a volume ratio of 100:1 is preferable for the present invention. Such a volume ratio and the structure of flow cell 14 permit an accurate measurement of ambient temperature even when reference resistor is heated to its operating temperature. Reference resistor 36 thus acts as a point of reference simulating the resistance of measuring resistor 24 as if no airflow existed. Accordingly, the effects of ambient temperature on the cooling rate of measuring thermistor 24 are taken into account by the construction of flow cell 14 as described herein.

Figure 5:
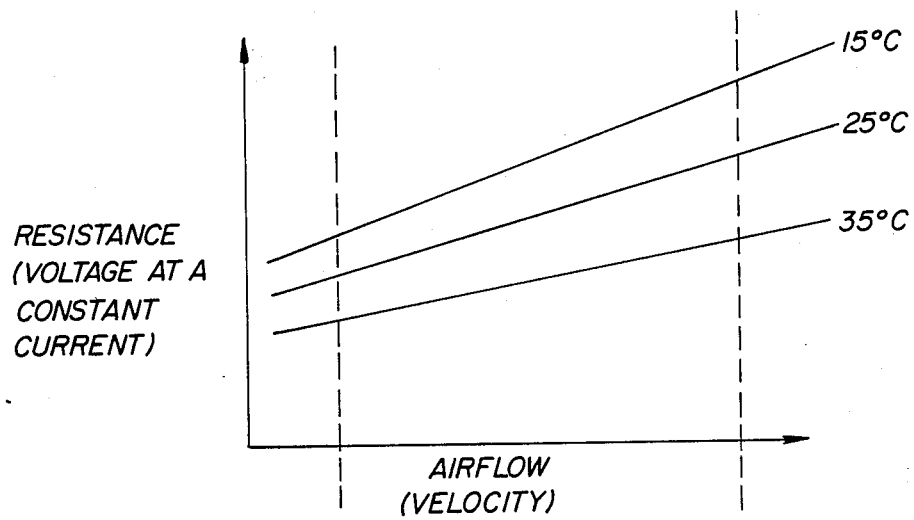
FIG. 5 is a graphic representation of the resistance versus airflow characteristics of a thermally sensitive electrical resistor, illustrating the varying characteristics at different temperatures.

As alluded to above, the cooling rate of measuring thermistor 24 is also affected by the fact that its resistance is changed due to its temperature-related resistance characteristics. In FIG. 5, a graphic illustration of resistance versus airflow characteristics of a thermally sensitive electrical resistor is depicted. Resistance is equated to a voltage at a constant current. It can be seen that the resistance of a thermally sensitive resistor, such as measuring resistor 24, increases, in linear fashion, with increased rates of heat transfer due to airflow or velocity. In addition, as the three parameters of temperature at 35° C., 25° C. and 15° C. illustrate, as the temperatures decreases, the resistance change is greater over the same range. As a result of such disparity, the voltage difference from zero velocity to the velocity represented at $V_N$ is not the same at all temperatures. This phenomenon is referred to as the velocity temperature effect or wind chill factor. As pointed out above, the ambient temperature effects should be eliminated from the determination of airflow related to the cooling of the thermistor exposed to the airflow. However, as the resistance and airflow characteristics of FIG. 5 illustrate, the resistance at zero velocity, represented by reference resistor 36, cannot be used as a reference in a bridge circuit if true accuracy of measurement is the desired goal. This change of slope of resistance between zero velocity and velocity at $V_N$, at different temperatures, is taken into account in accordance with the principles of the present invention.

In particular, it has been determined that the ratio of the change of slope with respect to change of temperature is equal to the ratio of the change of resistance of reference resistor 36 with respect to temperature. Once having determined this, the resistance of measuring resistor 24 may be modified by this aforementioned ratio. This modification of resistance of measuring resistor 24 acts as if there were no change in slope due to temperature changes thereby eliminating the velocity temperature effect, as described above, on measuring resistor 24. The resistance value at zero velocity represented by the resistance of reference resistor 36 may now be subtracted to obtain an error-free airflow measurement.

Figure 6:
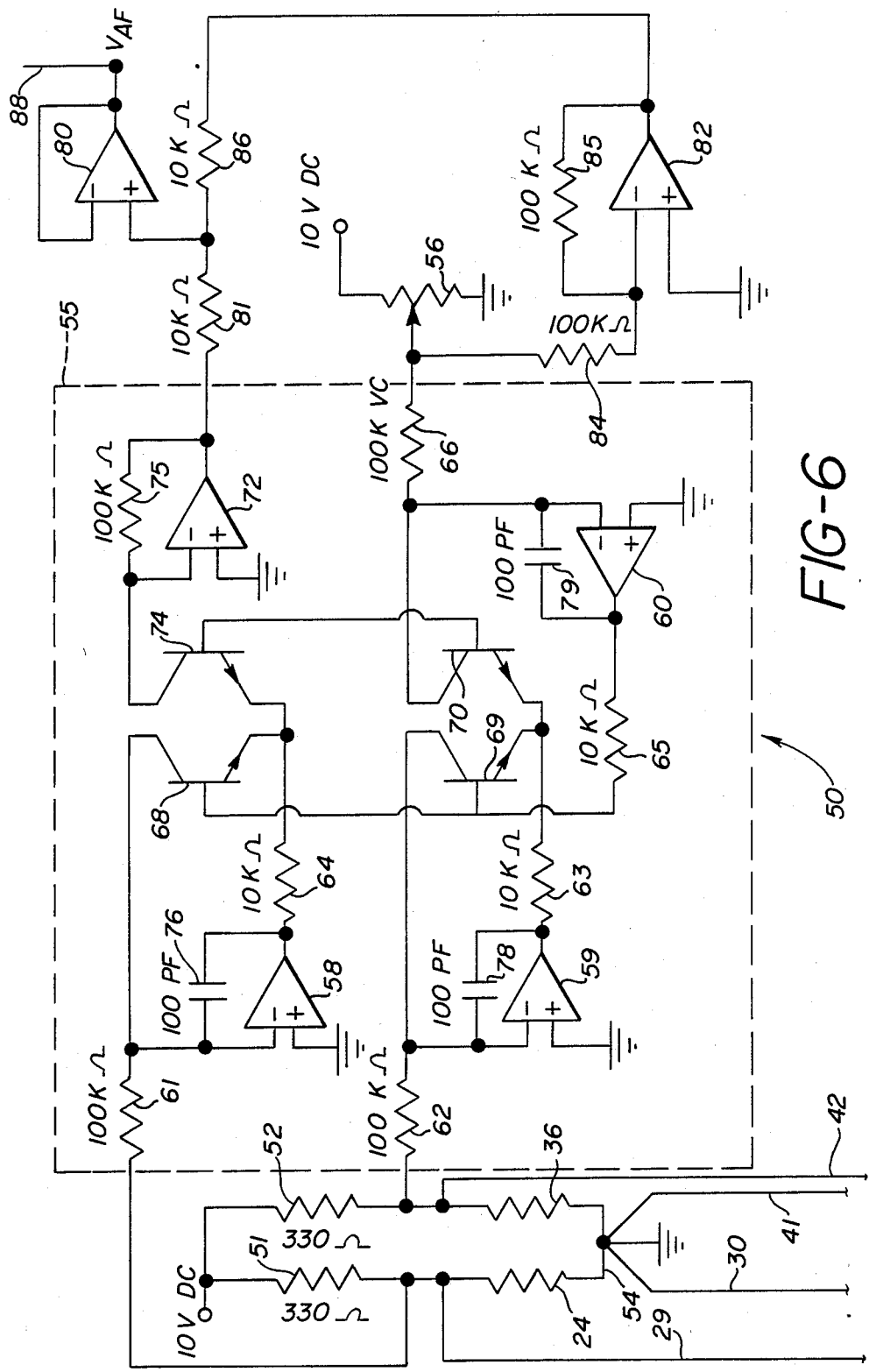
FIG. 6 is an electrical circuit diagram of one suitable circuit in accordance with the principles of the present invention, depicted with only one measuring resistor.

FIG. 6 illustrates one electrical circuit diagram which compensates for the temperature effects on velocity measurement due to ambient temperature effects as well as the resistance changes due to temperature characteristics of the thermally sensitive resistor. Inaccuracies result if a fixed voltage, representing the zero velocity reading, is subtracted from the voltage corresponding to the resistance of the measuring resistor at some velocity, $V_N$. The present invention overcomes this temperature phenomenon by calibrating the velocity of measuring resistor 24 at a certain, fixed temperature, such as, for example, 25° C. Any voltage calibrated velocity at a known temperature can then be related to the same calibration curve at a different temperature. A temperature- and airflow-compensated voltage output representative of airflow through the conduit can be determined according to the following relationship:

$$V_{AF} = \frac{V_M V_C}{V_R} - V_C \tag{1}$$

where, $V_{AF}$ is the voltage corresponding to airflow,
$V_M$ is the voltage related to measuring resistor 24,
$V_R$ is the voltage related to reference resistor 36,
$V_C$ is the voltage related to a calibrated resistance of the measuring resistor at zero velocity, and $$\frac{V_M V_C}{V_R}$$

is the voltage related to the compensated resistance value.

These voltage parameters, as well as their mathematical relationship, are produced in accordance with the present invention by the circuit illustrated in FIG. 6.

As seen in FIG. 6, the circuit 50 includes reference resistor 36 and measuring resistor 24, both of which are preferably thermistors. In the embodiment being described, there is only one measuring resistor included in the circuit, although more than one measuring resistor may be included as will hereinafter be described. Resistors 51 and 52 are arranged with thermistors 24 and 36 in a bridge circuit, referred to generally by numeral 54. The bridge circuit output terminals are connected to a logarithmic amplifier multiplier-divider circuit 55 designated by the dashed lines in FIG. 6. Circuit 55 multiplies the voltage developed across measuring resistor 24 by the ratio of the voltage related to the calibrated resistance of measuring resistor 24 at zero velocity to the voltage of measuring resistor 36. This calibrated resistance is developed at the adjustable resistor 56. Operational amplifiers 58, 59 and 60 with their associated resistors 61, 62, 63, 64, 65 and 66 and transistors 68, 69 and 70 form logarithmic amplifiers. An operational amplifier with transistor 74 and resistor 75 forms an antilog amplifier. Capacitors 76, 78 and 79 provide phase compensation to compensate for the effects of the gains added by the amplifiers.

At amplifier 72, its voltage output bears an antilog relationship to the sum and difference of the output voltages of amplifiers 58, 59 and 60 as expressed by the following relationship:

$$V_{72} = \text{antilog } (V_{58} - V_{59} + V_{60}) \tag{2}$$

As a result, $V_{OUT}$ may be calculated as follows:

$$V_{OUT} = \frac{V_{24} V_{56}}{V_{36}} \tag{3}$$

which is equivalent to the following relationship:

$$V_{OUT} = \frac{V_M V_C}{V_R} \tag{4}$$

where these voltage parameters are as described above.

The output of multiplier-divider circuit 55 is connected to a summing amplifier 80 through resistor 81. From variable resistor 56, the reference voltage is connected to an inverting amplifier 82 through input resistor 84 and feedback resistor 85 to establish unity gain. The output of amplifier 82 is connected to summing amplifier 80 through resistor 86. Output voltage of amplifier 80 is equivalent to $V_{AF}$ designated by numeral 88, the voltage corresponding to airflow. This output voltage of amplifier 80 is represented by the equation $V_{AF} = V_{OUT} - V_C$. Accordingly, mass airflow through the conduit is measured which takes into account and compensates for the combined effects of temperature and velocity on the measuring and reference resistors. The voltage corresponding to airflow through the conduit, as calculated above, substantially eliminates errors due to changes in ambient temperature and caused by velocity cooling of the thermally sensitive resistor which measures the airflow.

Figure 7:
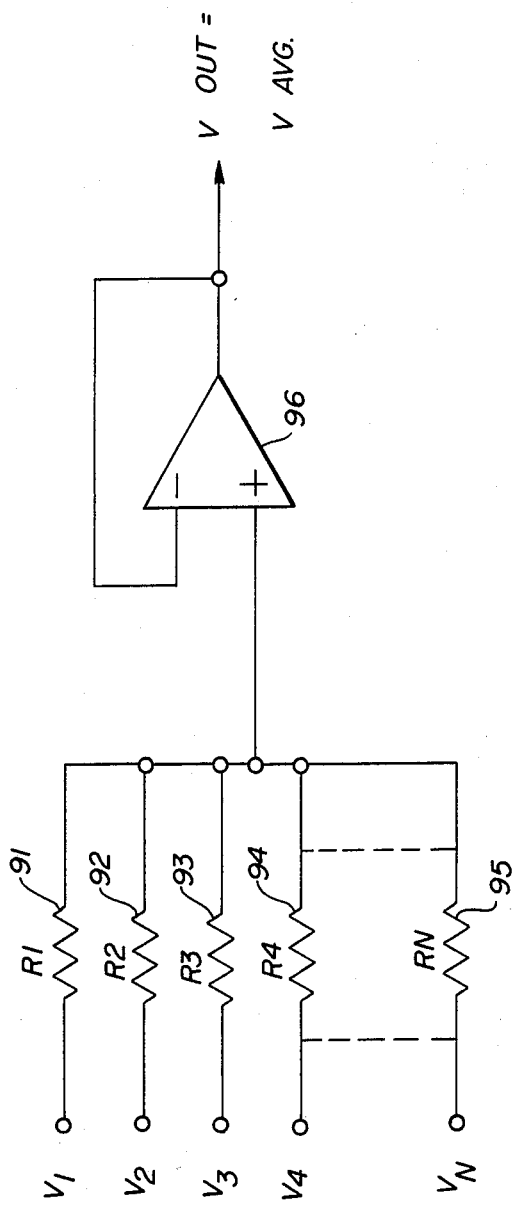
FIG. 7 is a schematic electrical circuit illustrating an arrangement for a network of measuring resistors to obtain an average of the effects of airflow in the conduit.

A number of measuring resistors may be placed in different locations within the conduit to provide an average measurement of airflow. Such an arrangement is illustrated in FIG. 1 where a measuring resistor is included within each flow cell 12. In such an arrangement, the electrical resistors may be included in an electrical network 90 such as illustrated in FIG. 7. Individual thermally sensitive electrical resistors, such as thermistors 91, 92, 93, 94 and 95, each with a constant current sufficient to heat the thermistors to a temperature, for example, above 100° C. to insure good sensitivity with changes in velocity, are connected to a voltage follower 96 in such a way that all the voltages may be averaged. If the resistance values of thermistors 91–95 are all equal, then the following relationship applies:

$$V_{OUT} = \frac{V_1 + V_2 + V_3 + \ldots V_N}{N} = V_{AVG} \quad (5)$$

It is therefore possible to average the effects of velocity on a network of thermistors in a flowing airstream which in turn yields a voltage representing the average velocity in a particular plane across the conduit. $V_{OUT}$ ($V_{AVG}$) may be substituted for measuring resistor 24 in bridge circuit 54 of the electrical circuit set forth in FIG. 6.

As pointed out above in conjunction with FIG. 5, the resistance of a thermally sensitive resistor, such as measuring resistor 24, increases in linear fashion with increased rates of heat transfer due to velocity of air through the conduit. A family of curves may be calculated showing voltage, $V_M$, as a function of velocity, V, of airflow through the conduit at different temperatures. Simple equations for these curves may be arrived at by a standard nth order regression analysis technique providing an equation in the form:

$$V_M = A + Bv + Cv^2 \quad (6)$$

Although only three curves are illustrated in FIG. 5 at 15° C., 25° C. and 35° C., a family of curves taken at 1° C. increments may be developed.

It has been determined that the relationship between the voltage developed by measuring resistor 24 and velocity of airflow is very nearly linear (as illustrated in FIG. 5) over a limited range of velocity of airflow. Such velocity of airflow may range between a few hundred feet per minute to perhaps 2500 to 3000 feet per minute. As the velocity of airflow through the conduit increases, it can be seen that the non-linear term (represented by constant C in equation 6) becomes more significant. As a result, the magnitude of the error may increase to exceed 5% over the larger range of velocity which may occur in airflow systems of the type discussed herein. Errors in the determination of velocity of airflow of up to 10%, however, are currently permissible in most airflow systems. While the previously explained techniques provide a substantial improvement in the accuracy of velocity determinations, still further improvements may be obtained in accordance with the principles of the present invention. Indeed, use of the technique described below is expected to provide consistent measurements with an error of 1% or less with virtually no limit on velocity and temperature levels.

This more accurate technique of determining airflow, i.e., velocity of flowing fluid, through a conduit relies upon the same preferred sensing elements described above in conjunction with FIGS. 1–4. Thus, at least one thermally sensitive electrical resistor 24 is mounted within conduit 10 so that it is within the airflow within the conduit. If a plurality of such thermally sensitive measuring resistors is employed, they may be electrically connected in a network arrangement so that an average velocity of airflow through the conduit may be sensed. A reference cell 14 is also provided which includes a thermally sensitive electrical resistor 35 which is substantially uninfluenced by the airflow through the conduit so that the temperature of fluid ambient to the conduit may be sensed. It has been found that reference resistor 36 may be employed which uses very little current so that substantially no heat is generated by the reference resistor. As a result, if such a reference resistor is utilized, the volume requirements of the housing of flow cell 14, as set forth above, are inapplicable to this technique of the invention. Of course, should a reference resistor be used which does generate a substantial amount of heat, then the housing of flow cell 14 should conform to the volume requirements explained above.

In accordance with this technique, measuring resistor 24 provides a voltage, $V_M$, relating to the resistance value thereof; reference resistor 36 provides a voltage, $V_R$, relating to its resistance value. These two values, which respectively measure the uncorrected velocity of airflow through the conduit and the ambient temperature with respect to the conduit, are relied upon by a microprocessor-based system to minimize and substantially eliminate errors due to changes in ambient temperature and caused by velocity cooling of measuring resistor 24.

By employing appropriate electrical circuitry which can store information and make calculations based on that information, such as is available with current microprocessor technology, accurate measurements of airflow may be made rapidly and consistently. Such a microprocessor-based electrical system 98 may be programmed to use one or more algorithms which ultimately calculates a velocity of airflow through conduit 10 which takes into account changes in ambient temperature and the velocity cooling effect of the thermally sensitive measuring resistor.

A first algorithm may be generated by establishing the relationship between the temperature ambient to the conduit, $t_O$, the measuring resistor body temperature, t, the voltage drop, $V_M$, across the measuring resistor caused by air flowing through the conduit, and the power dissipation factor, d, usually in milliwatts (mW) per degrees C, of the measuring resistor. Two equations may be relied upon for establishing the aforementioned relationship. One of these equations relates to the steady state determination for a self-heated thermally sensitive resistor and is as follows:

$$P = V_M i = d(t - t_o) \quad (7)$$

where P is the power of the measuring resistor, i is the current and $V_M$, d, t and $t_o$ are as defined above.

The second of these equations establishes the resistance of a thermally sensitive resistor with a negative temperature coefficient of resistance and is as follows:

$$R = R_o e^{\beta(1/T - 1/T_o)} \quad (8)$$

where, $R_o$ is the resistance at 25° C., $T_o$ is temperature at 293.15° K.,

T is temperature of the measuring resistor in °K., $\beta$ is the material constant of the measuring resistor, and R is the resistance of the measuring resistor at T °K.

By solving equations 7 and 8 simultaneously for different values of T and d, a series of values for d and $V_M$ may be generated for any ambient temperature. By using an nth power regression analysis, an equation directly relating voltage of the measuring resistor, $V_M$, and the power dissipation factor, d, may be derived, and is purely synthesized into the following form:

$$d = A + BV_M + CV^2_M + DV^3_M \ldots \quad (9)$$

where A, B, C and D are constants.

The constants, A, B, C and D, are determinable by taking into account the variables of equations 7 and 8, above. By determining the constants for equation 9 for each ambient temperature and storing them in memory, preferably using ambient temperature in 1° C. increments, the value of d may be found instantly for any voltage of the measuring resistor at any particular ambient temperature. As a result of the aforementioned regression analysis, a very reliable linear relationship may be established between the power dissipation factor and the voltage developed across the measuring resistor. Use of a microprocessor 98 and related electrical circuitry facilitates the use of these types of algorithms for purposes of the present invention.

Another algorithm to be developed for the calculation of velocity of airflow through the conduit involves the physical configuration of the measuring resistor. As explained above, measuring resistor 24 is mounted within a cylindrically shaped flow tube 20 oriented within the conduit so that air may flow therethrough. A standard form of a heat transfer equation for velocity cooling which relates power dissipation and velocity has the following form:

$$d = j + kv^n \quad (10)$$

where,
k is the heat transfer coefficient of the material
n is a factor determined by the shape of the object being cooled
j is the zero-velocity heat dissipation factor, and
d and v are as defined above.

For each physical configuration of the measuring resistor and/or the housing in which the resistor is mounted, the values of n, j and k in equation 10 must be determined, which is usually by empirical measurements. For a substantially cylindrical object, the value of n, for example, is approximately 0.5 while such value is approximately 1.0 for a flat plate. Taking equation 10 and applying an nth order regression analysis provides an equation in the following form:

$$v = X - Yd + Zd^2 \ldots \quad (11)$$

where X, Y and Z are constants relating to the physical configuration of the measuring resistor.

Once the values of the constants X, Y and Z are empirically determined, these values may be pre-programmed into the microprocessor 98. Accordingly, a relationship is established between velocity of airflow through the conduit and the power dissipation factor which is independent of temperature and electrical characteristics of the resistor, but is fixed by the physical configuration of the measuring resistor itself.

Having explained the use of the various algorithms in conjunction with a microprocessor-based system for calculating velocity of airflow, the technique of the present invention is carried out by a few simplified steps. The preliminary steps include measuring or deriving the values of n, j and k in equation 10 based on the physical configuration of measuring resistor 24. The values of n, j and k may be entered into the microprocessor for subsequent calculations, including the calculation of constants X, Y and Z for the regression analysis of equation 11. The values of the constants X, Y and Z are stored in the microprocessor. As another preliminary step, the values of the constants A, B, C and D for equation 9 may be stored in the microprocessor for a range of ambient temperatures expected to be encountered in the use of the present invention, as described above.

During actual measurement of airflow conditions, which measurements may be viewed on screen 99 or printed, if desired, the microprocessor 98 may be programmed to read the voltage $V_R$ related to the resistance value of reference resistor 36. This value may then be converted to digital form. Also, the microprocessor may be programmed to read the voltage $V_M$ from measuring resistor 24 (or the average value of a plurality of measuring resistors) related to velocity of airflow through the conduit, and convert that reading to digital form. Insofar as the voltage $V_R$ defines the ambient temperature associated with the conduit, the microprocessor then calculates a value of the power dissipation factor, d, by solving equation 9; the measured value of $V_R$ is used by the microprocessor to call up the values of the preliminarily calculated constants A, B, C and D associated with the ambient temperature. As described above, these constants are found by extracting them from a listing of constants versus ambient temperature, preferably in increments of 1° C. Next, the microprocessor calculates a value of velocity from equation 11. This velocity may be transmitted in digital form or may be converted to analog form. The calculated velocity accounts for changes in temperature ambient to the conduit and changes caused by the velocity cooling effect of the thermally sensitive electrical resistor. In accounting for such changes, the measured velocity of airflow through the conduit is modified by a calculated factor which substantially reduces or eliminates errors due to ambient temperature and velocity cooling effects.

Thus, the present invention provides an apparatus and method for the measurement of airflow through a conduit which accounts for the increased rates of heat transfer related to the combined effects of temperature and velocity (wind chill factor). Errors in airflow measurement are eliminated by virtue of the principles of the present invention.

What is claimed is:

1. An apparatus for the measurement of fluid flow through a conduit comprising:
   at least one thermally sensitive electrical resistor serving as a measuring resistor for location within said conduit and exposure to the flow of fluid therethrough, the resistance value of said measuring resistor being a function of flow in said conduit;
   a thermally sensitive electrical resistor serving as a reference resistor for association with said conduit, the resistance value of said reference resistor being a function of temperature of fluid ambient to said conduit and being substantially uninfluenced by the flow in said conduit;
   electrical circuit means for determining the voltage across said measuring resistor and the voltage across said reference resistor and for using said voltages in the calculation of a value of velocity of fluid flow through said conduit; and means for calculating the velocity of fluid flow in the conduit in accordance with an equation which uses a numerical value equal to a power dissipation factor of said measuring resistor, which power dissipation factor itself is calculated, with said means for calculating, using a series of pre-calculated constants related to the electrical characteristics of said measuring resistor.

2. The apparatus of claim 1 wherein said means for calculating employs the following equation:

$$V = X + Yd + Zd^2$$

where X, Y and Z are constants relating to the physical configuration of said measuring resistor, and where the variable d is said numerical value equal to the calculated power dissipation factor.

3. The apparatus of claim 2 wherein said measuring resistor is mounted in a substantially cylindrically shaped flow tube oriented in said conduit so that fluid is flowable therethrough, said constants relating to the physical configuration of said tube with the mounting resistor mounted therein.

4. The apparatus of claim 2 wherein said means for calculating includes means to calculate the numerical value (d) in accordance with predetermined data which utilizes values of electrical characteristics of said measuring resistor as variable terms thereof.

5. The apparatus of claim 4 wherein said means for calculating employs the following form for calculating the numerical value:

$$d = A + BV_M + CV^2_M \ldots$$

where A, B and C are pre-calculated constants relating to temperature conditions of fluid ambient to said conduit determinable in accordance with a voltage ($V_R$) across said reference resistor and where the variable $V_M$ is a voltage across said measuring resistor.

6. The apparatus of claim 5 wherein said means for calculating includes information storage means for storing values of said constants X, Y and Z to be entered into said storage means after said constants are determined, and for storing values of said constants A, B and C to be entered into said storage means after being pre-calculated.

7. The apparatus of claim 6 wherein the values of said constants A, B and C are pre-calculated for each ambient temperature in one degree increments over a range of temperatures.

8. The apparatus of claim 7 wherein said electrical circuit means, said calculating means and said storage means are governed by a microprocessor so that values of velocity of fluid flow through said conduit are calculable using the voltage ($V_M$) relating to the resistance value of the measuring resistor and using the voltage ($V_R$) relating to the resistance value of the reference resistor.

9. The apparatus of claim 1 wherein there is a plurality of thermally sensitive measuring resistors each locatable at a different position within said conduit and being electrically connected in a network arrangement so that an average velocity of fluid flow through said conduit may be calculated.

10. A method for the measurement of fluid flow through a conduit comprising:
  determining from measuring means a first value related to the velocity of fluid flowing through said conduit and a second value related to the temperature of fluid ambient to said conduit;
  determining a third value related to a power dissipation factor of said measuring means wherein said third value is numerically equal to said power dissipation factor and is calculated using stored pre-calculated constants relating to the electrical characteristics of said measuring means;
  establishing an equation related to the physical configuration of said measuring means; and
  using said first, second and third values and said equation to calculate a velocity indication which substantially eliminates errors due to changes in ambient temperature and caused by velocity cooling within said conduit.

11. The method of claim 10 wherein said equation is represented by a series of constants based on empirically derived data.

12. The method of claim 11 wherein said velocity indication is calculated as a function of said third value and by use of said equation.

13. The method of claim 12 which includes using a microprocessor to govern the use of said values to calculate said velocity indication.

14. The method of claim 13 which includes pre-programming said microprocessor with said pre-calculated constants for determining said third value.

15. The method of claim 14 which includes pre-programming said microprocessor for the calculation of said third value in 1° C. increments.

16. An apparatus for the measurement of fluid flow through a conduit comprising:
  means for measuring a first value related to the velocity of fluid flowing through said conduit and a second value related to the temperature of fluid ambient to said conduit;
  means for determining a third value related to a power dissipation factor of said means for measuring wherein said third value is numerically equal to said power dissipation factor and is determined using pre-calculated constants relating to the electrical characteristics of said means for measuring;
  means for establishing an equation related to the physical configuration of said means for measuring; and
  means for calculating, using said first, second and third values and said equation, a velocity indication which substantially eliminating errors due to changes in ambient temperature and caused by velocity cooling within said conduit.

* * * * *